US012090777B2

(12) United States Patent
Kageyama et al.

(10) Patent No.: US 12,090,777 B2
(45) Date of Patent: Sep. 17, 2024

(54) WRITING INSTRUMENT REFILLS AND WRITING INSTRUMENT

(71) Applicant: Kotobuki & Co., Ltd., Kawagoe (JP)

(72) Inventors: Hidehei Kageyama, Kawagoe (JP); Toshikazu Sasaki, Kawagoe (JP)

(73) Assignee: KOTOBUKI & CO., LTD., Kawagoe (JP)

( * ) Notice: Subject to any disclaimer, the term of this patent is extended or adjusted under 35 U.S.C. 154(b) by 0 days.

(21) Appl. No.: 18/139,456

(22) Filed: Apr. 26, 2023

(65) Prior Publication Data

US 2023/0347682 A1 Nov. 2, 2023

(30) Foreign Application Priority Data

Apr. 28, 2022 (JP) ................................ 2022-074817

(51) Int. Cl.

| | |
|---|---|
| ***B43K 24/04*** | (2006.01) |
| ***B43K 7/02*** | (2006.01) |
| ***B43K 7/12*** | (2006.01) |
| ***B43K 27/08*** | (2006.01) |
| ***B43K 27/12*** | (2006.01) |

(52) U.S. Cl.
CPC ................ *B43K 24/04* (2013.01); *B43K 7/02* (2013.01); *B43K 7/12* (2013.01); *B43K 27/08* (2013.01); *B43K 27/12* (2013.01)

(58) Field of Classification Search
CPC ........ B43K 24/04; B43K 27/08; B43K 27/12; B43K 7/02; B43K 7/12
USPC ............................................................ 401/30
See application file for complete search history.

(56) References Cited

U.S. PATENT DOCUMENTS 1,893,130 A * 1/1933 Chelazzi ................ B43K 5/005 401/162
6,302,609 B1 * 10/2001 Machida .................. B43K 7/08 401/209

FOREIGN PATENT DOCUMENTS

JP 2575795 Y2 * 2/1999
JP 2011-240555 A 12/2011

* cited by examiner

*Primary Examiner* — Jennifer C Chiang
(74) *Attorney, Agent, or Firm* — MCGINN I.P. LAW GROUP, PLLC.

(57) ABSTRACT

In one embodiment, a writing instrument refill includes a first portion having flexibility, and a second portion having a cross-sectional area larger than a cross-sectional area of the first portion, wherein the center of figure of the cross section of the first portion is offset from the center of the figure of the cross section of the second portion, the first portion and the second portion are formed integrally, and a part of the first portion has an outer diameter smaller than an outer diameter of the other part of the first portion.

14 Claims, 14 Drawing Sheets

[Fig. 1A]
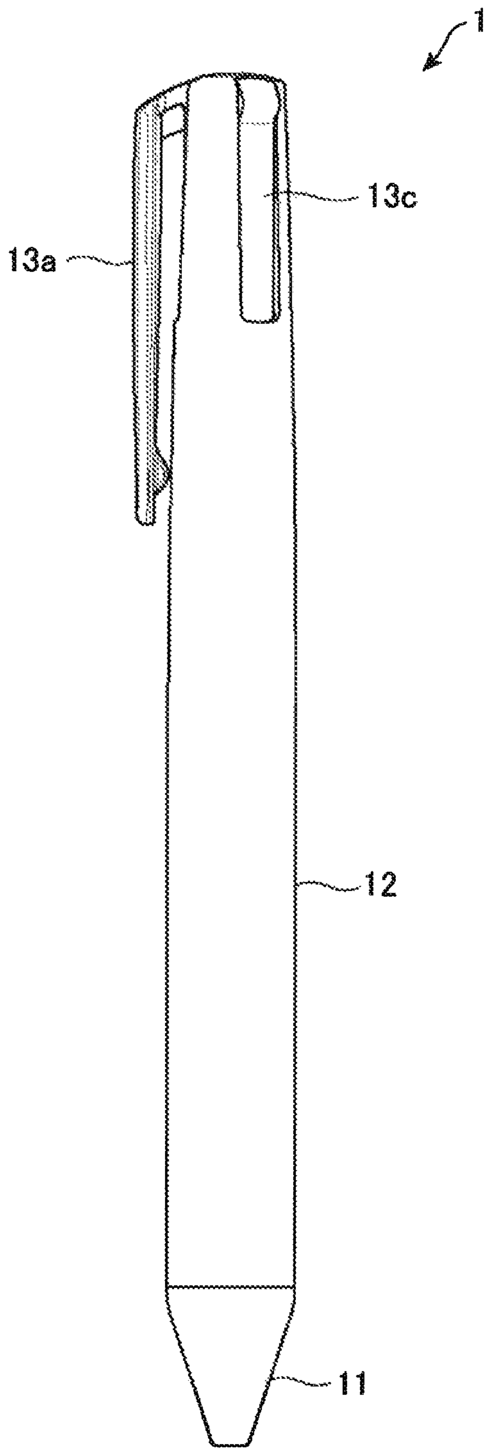

[Fig. 1B]
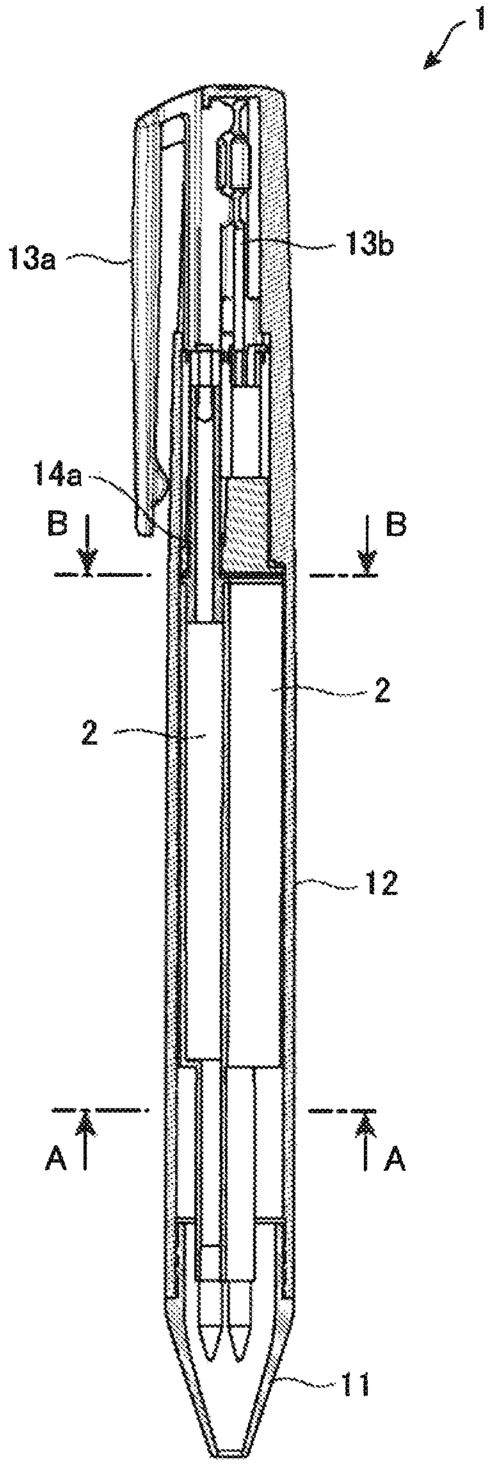

[Fig. 1C]
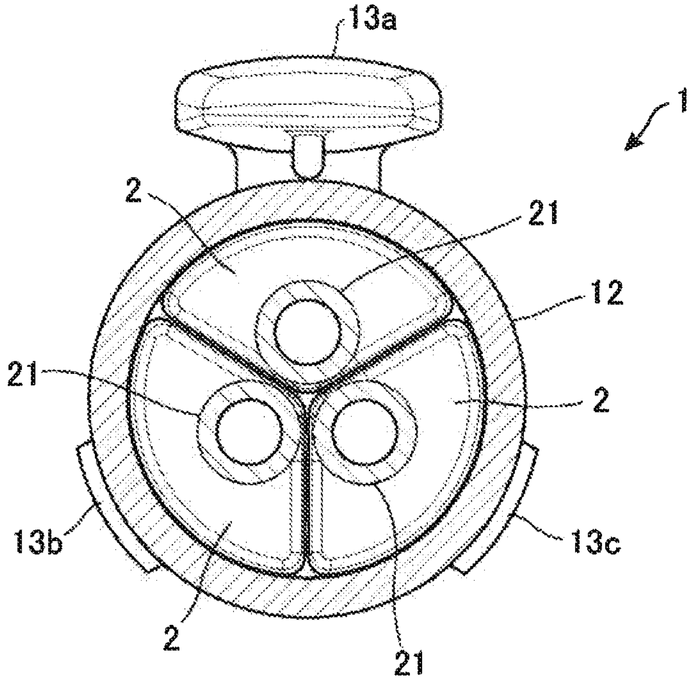
[Fig. 1D]
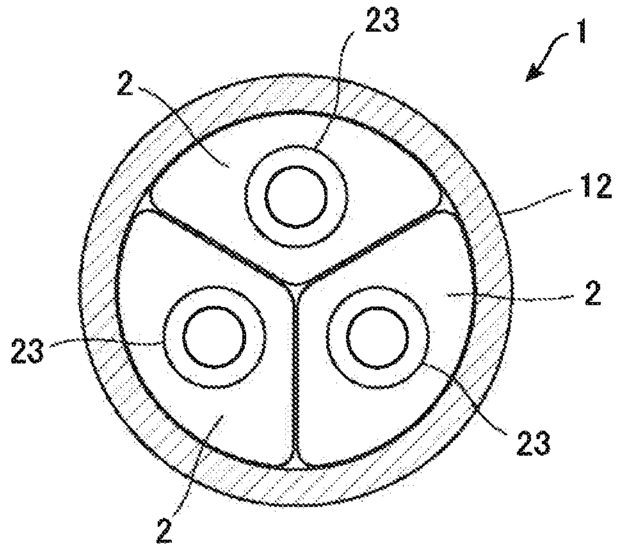

[Fig. 2A]
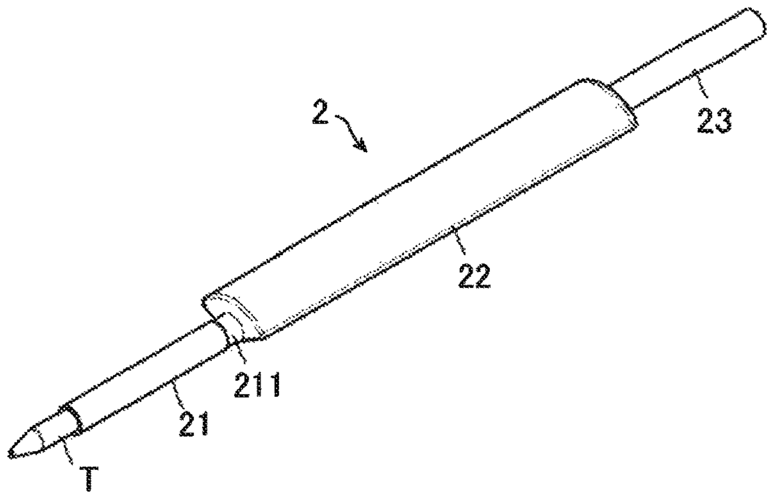
[Fig. 2B]
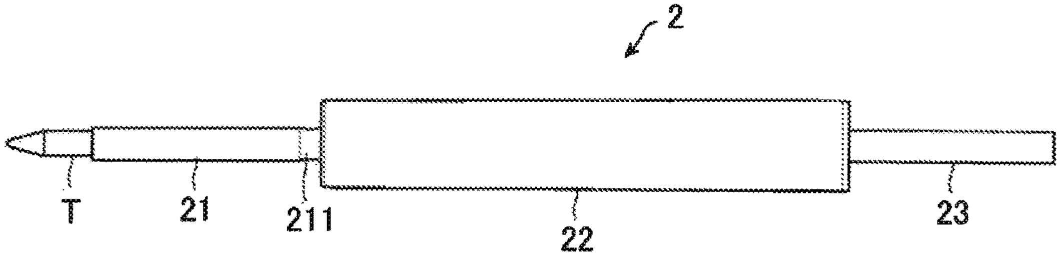
[Fig. 2C]
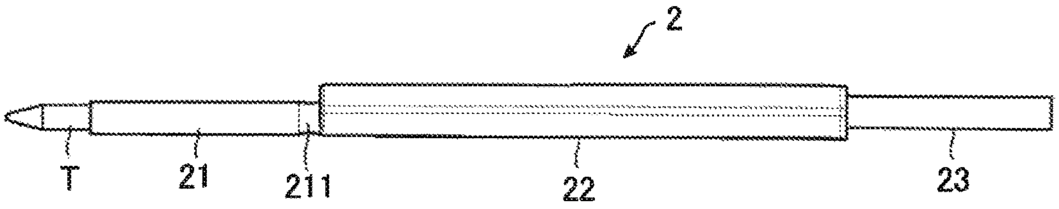
[Fig. 2D]
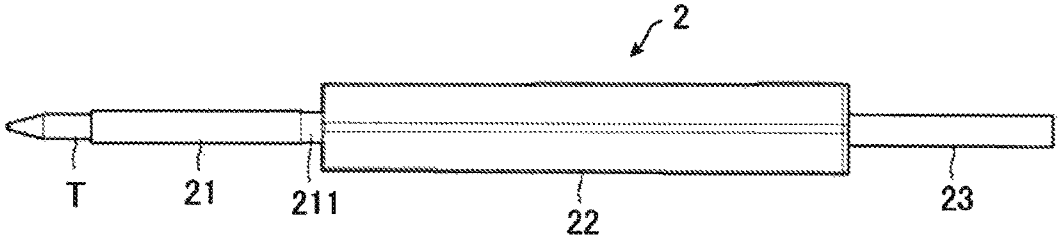
[Fig. 2E]
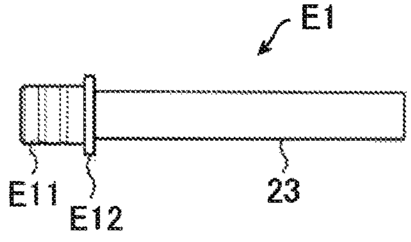

[Fig. 3]
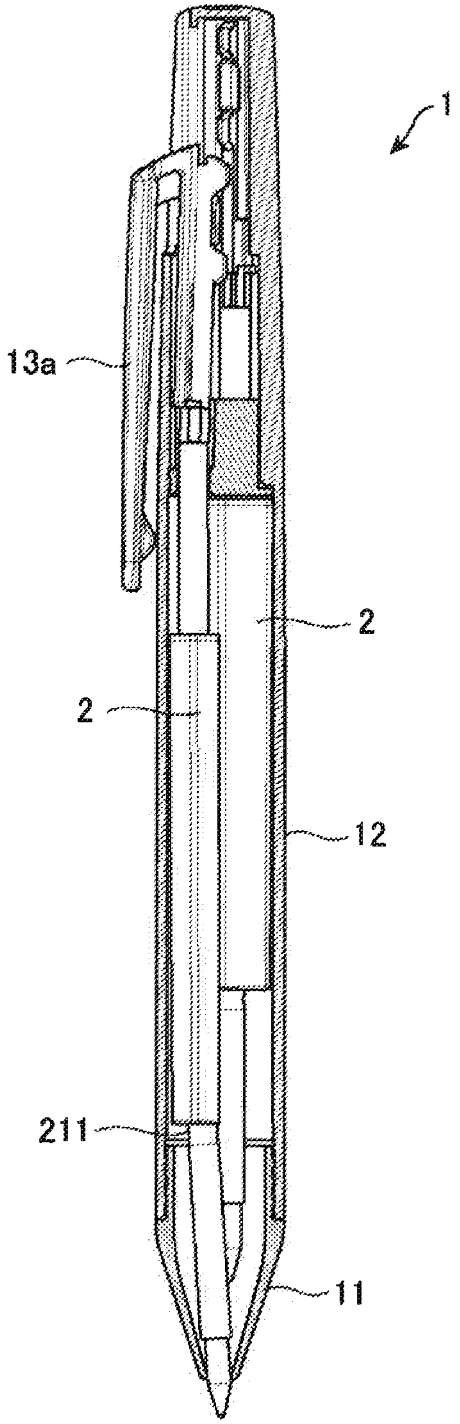

[Fig. 4A]
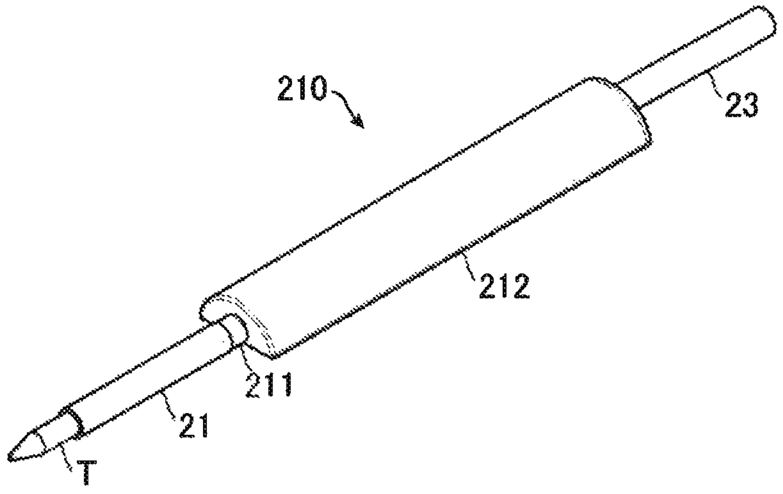
[Fig. 4B]
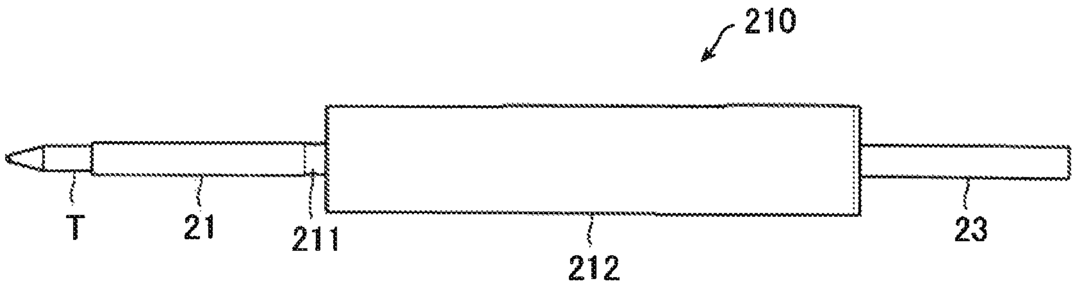
[Fig. 4C]
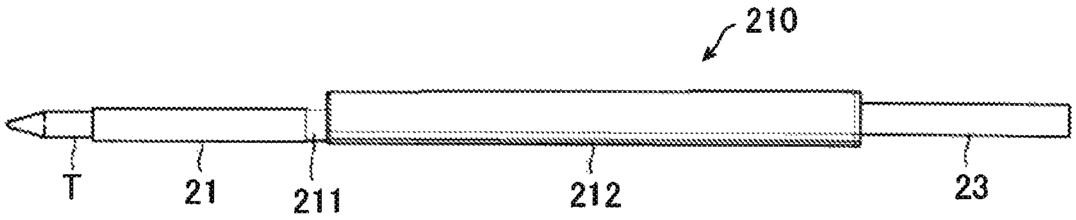
[Fig. 4D]
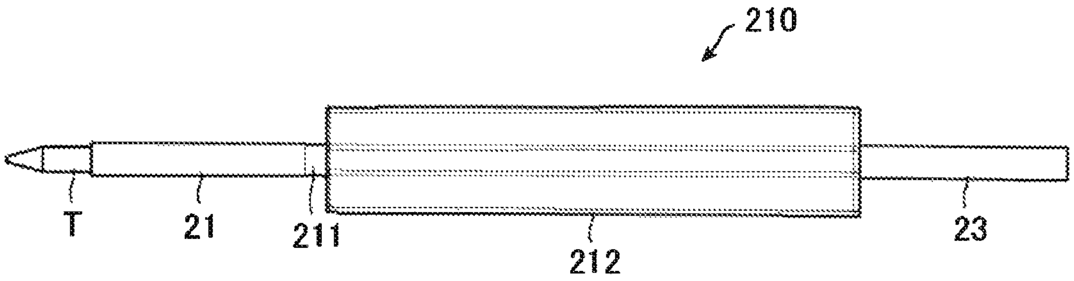

[Fig. 5A]
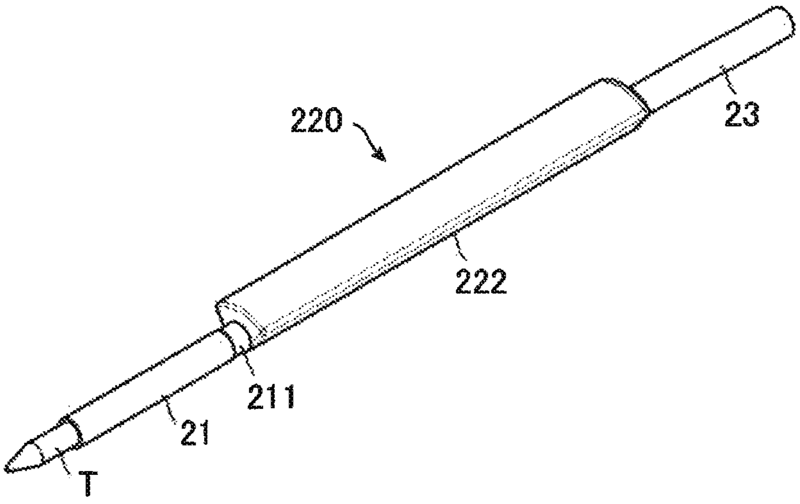
[Fig. 5B]
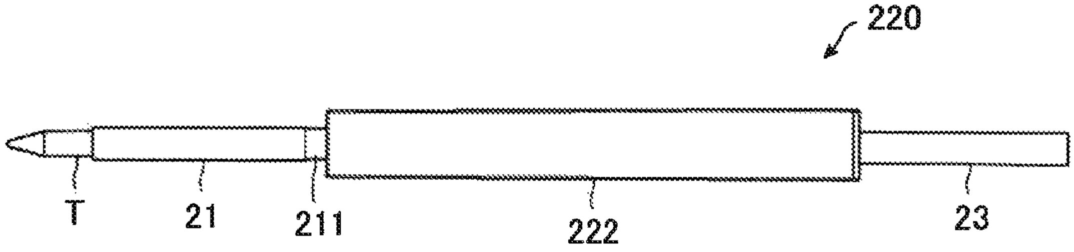
[Fig. 5C]
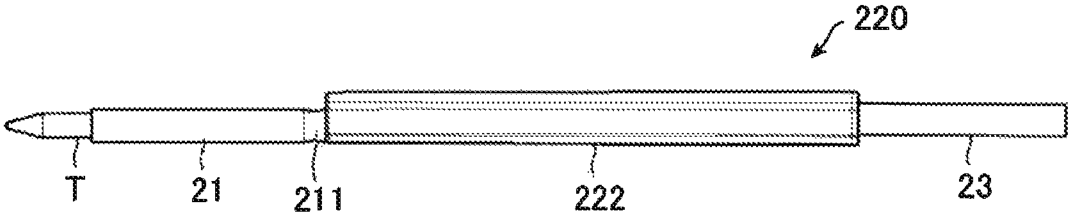
[Fig. 5D]
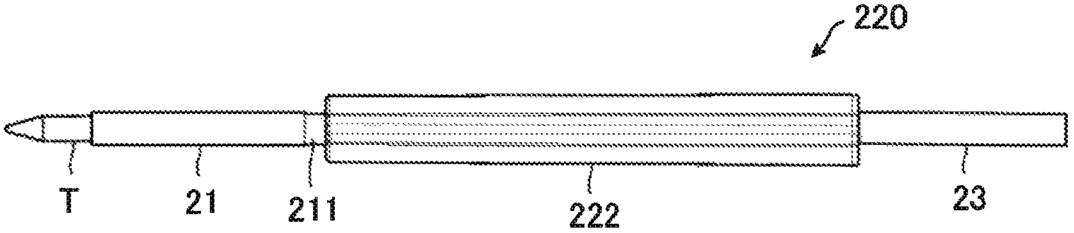

[Fig. 6A]
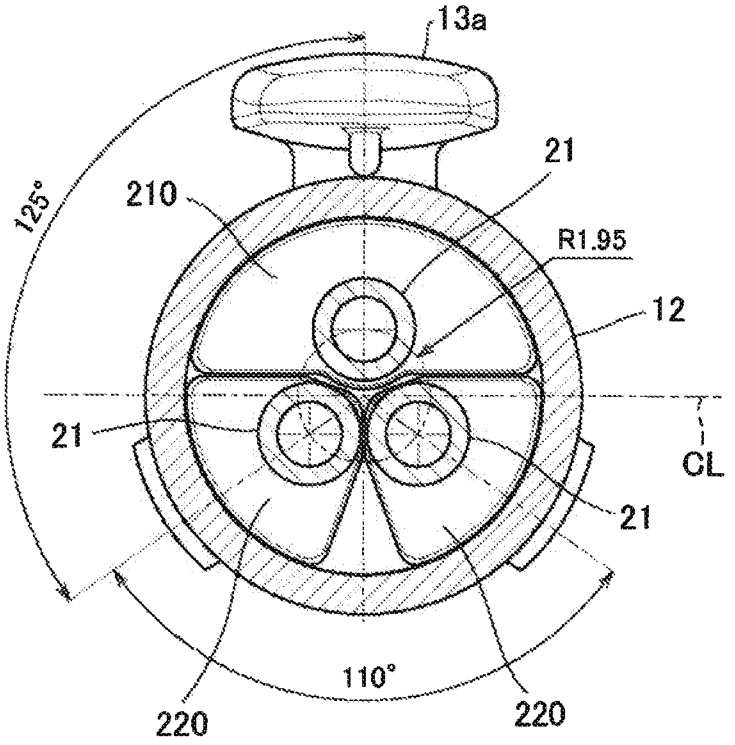
[Fig. 6B]
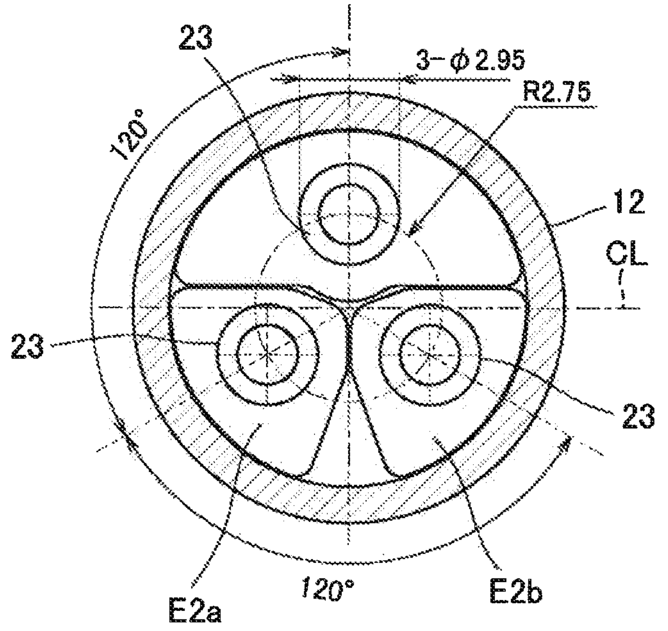

[Fig. 7A]
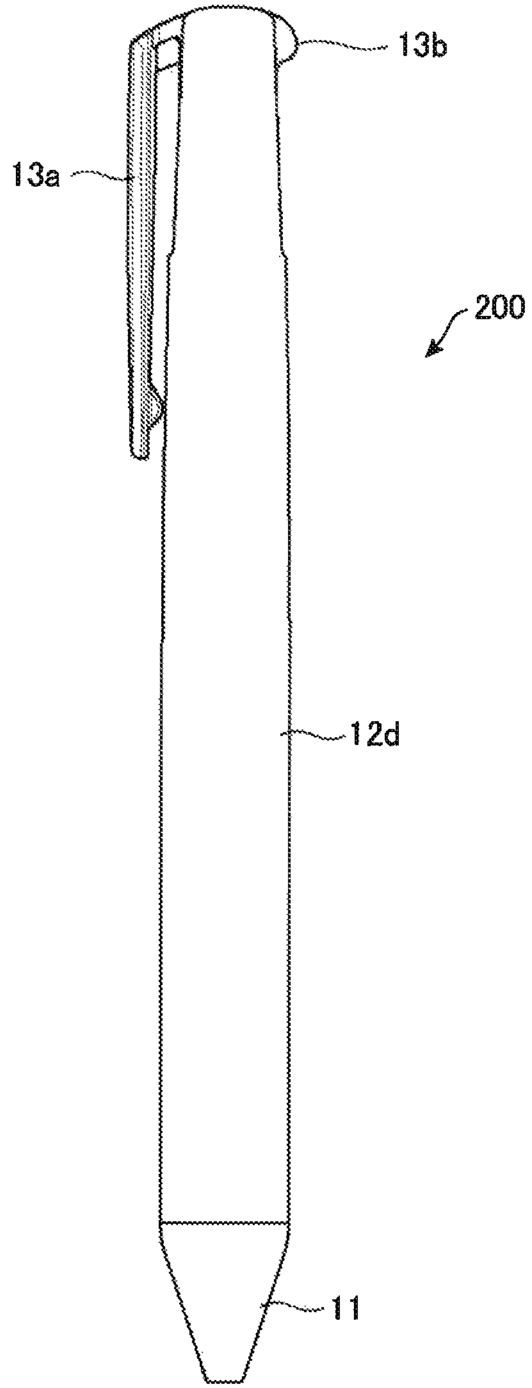

[Fig 7B]
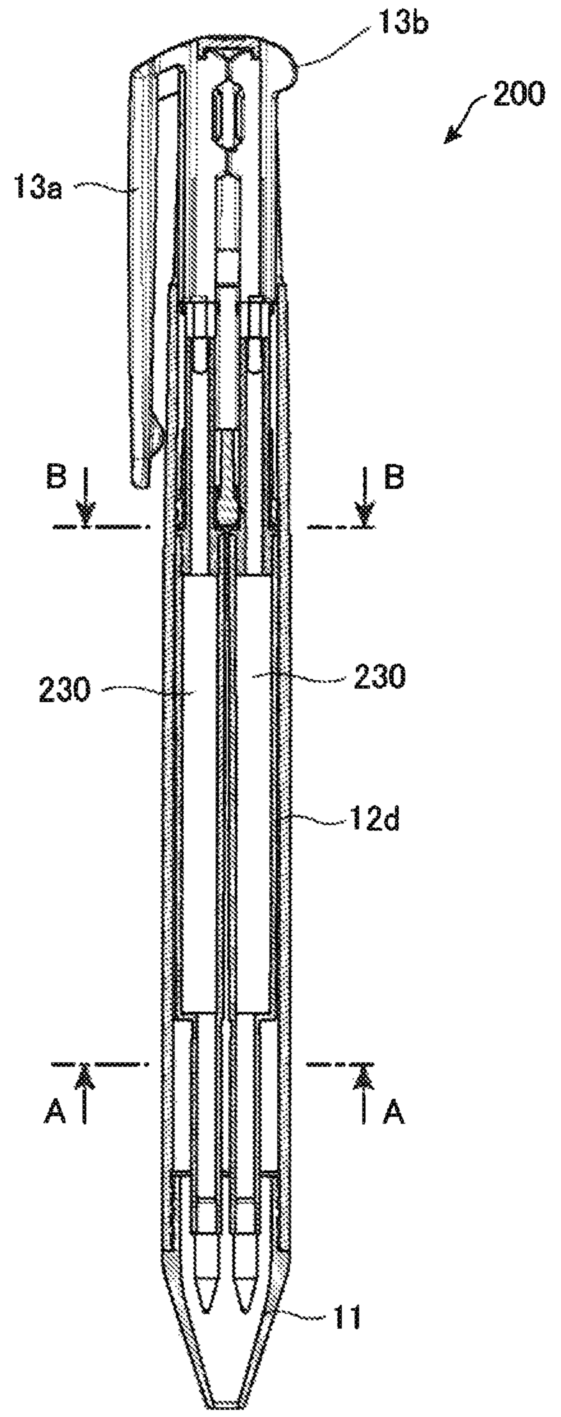

[Fig. 7C]
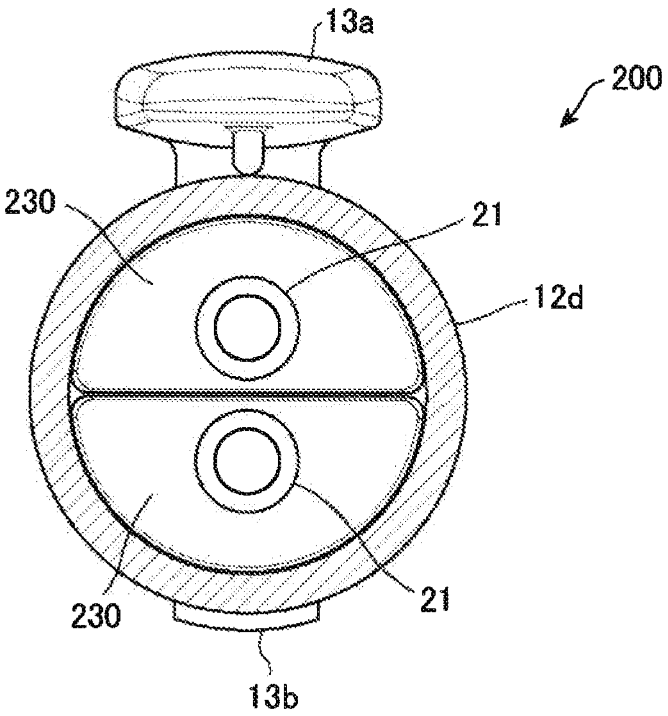
[Fig. 7D]
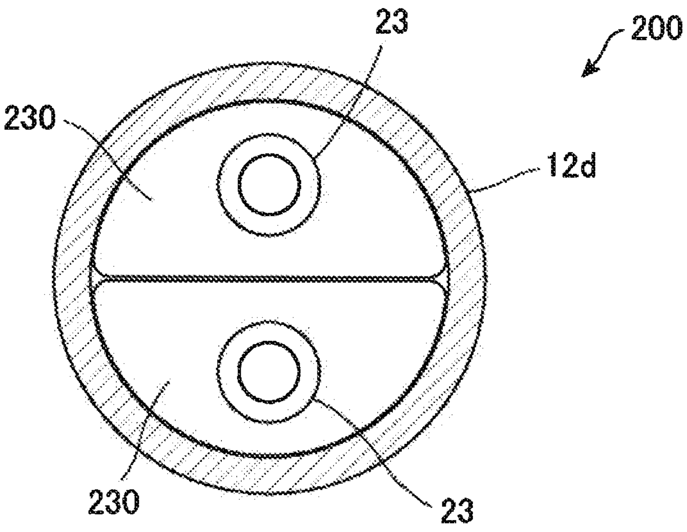

[Fig. 8A]
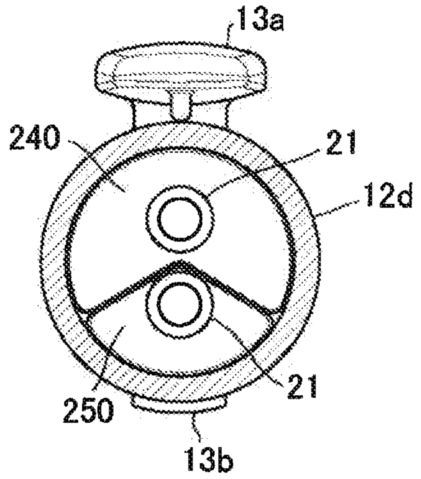
[Fig. 8B]
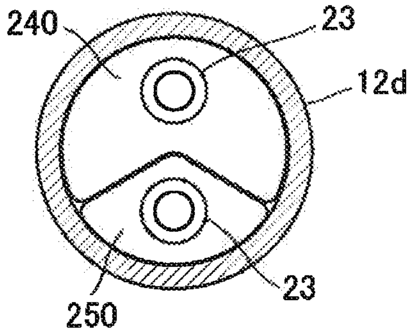
[Fig. 9A]
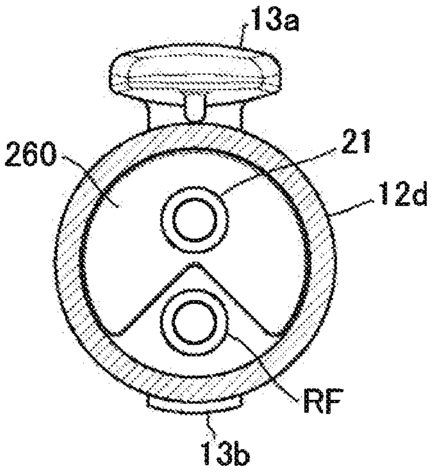

[Fig. 9B]
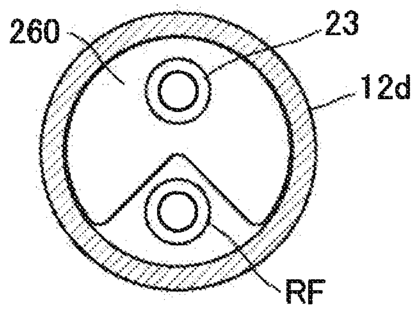
[Fig. 10A]
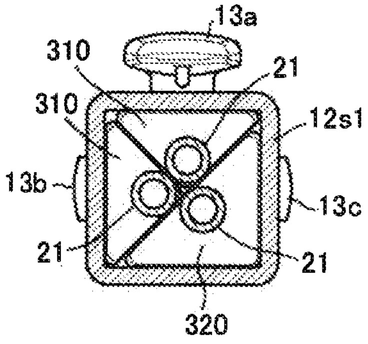
[Fig. 10B]
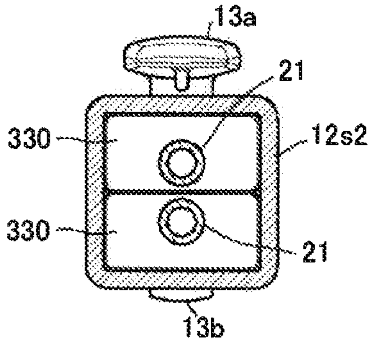
[Fig. 11A]
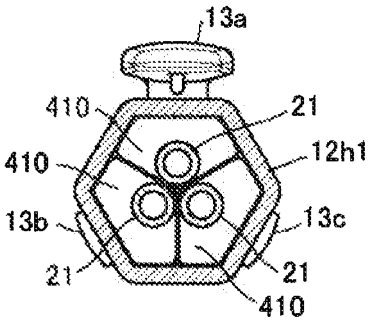

[Fig. 11B]
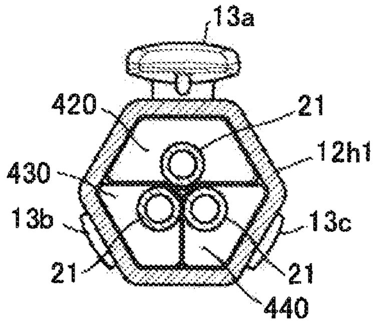
[Fig. 11C]
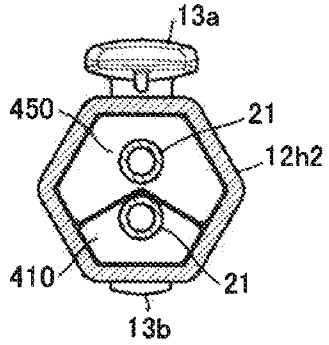

WRITING INSTRUMENT REFILLS AND WRITING INSTRUMENT

BACKGROUND

1. Technical Field

The present disclosure relates to writing instrument refills and a writing instrument.

2. Description of the Related Art

In a conventional multi-refill writing instrument, a plurality of refills are. Housed in a shaft tube so as to be movable in the axial direction of the refills, and actuators are coupled to the rear ends of the refills, each of the actuators is inserted into each of elongated holes formed on a rear outer peripheral surface of the shaft tube in an axially slidable manner, and one of the actuators is moved forward and held on the front end side of the elongated hole, thereby causing the tip of the refill coupled to this actuator to protrude from the tip of the shaft tube. In this multi-refill writing instrument, the rear ends of the elongated holes are closed, the actuators are configured to be movable in and out of the elongated holes in its radial direction, and the refills are movable in and out of the shaft tube by passing through the elongated holes in the radial direction while being coupled to the actuators (see, for example, paragraphs [0011] and [0021] of Japanese Patent Application Laid-Open No. 2011-240555). In this writing instrument, since the actuators can be freely moved in and out of the elongated holes in its radial direction, the actuator and the refills connected thereto can be taken out from the elongated holes and the actuators and the refills can be inserted through the elongated holes when replacing the refills.

SUMMARY

In general, it is desirable to increase the capacity of a refill (in particular, the cross-sectional area of an ink container) that contains ink in order to extend the writing distance of the writing instrument.

On the other hand, in a writing instrument such as a multi-color refill ballpoint pen, for example, it is also desirable to use a refill in a curved shape.

It is also desirable that refills can be produced with high productivity.

However, it has been difficult to provide a refill for a writing instrument having a large capacity that can be produced with high productivity and used in a curved shape, as well as a writing instrument containing said refill.

The present disclosure discloses a writing instrument refill with a large capacity that can be produced with high productivity and used in a curved shape, and a writing instrument containing said refill.

A writing instrument refill of a first aspect according to the present invention includes a first portion having flexibility, and a second portion having a cross-sectional area larger than that of the first portion, wherein a center of figure (centroid) of a cross section of the first portion is offset from (eccentric with respect to) a center of figure of a cross section of the second portion, the first portion and the second portion are formed integrally, and a part of the first portion has an outer diameter smaller than an outer diameter of other part of the first portion.

A writing instrument of a second aspect according to the present invention includes a plurality of the refills of the first aspect described above.

According to the writing instrument refill and the writing instrument of the first and second aspects, it is possible to provide a writing instrument refill having a large capacity that can be produced with high productivity and used in a curved shape, and a writing instrument containing said refill.

BRIEF DESCRIPTION OF THE DRAWINGS

FIG. 1A is a diagram illustrating an appearance of a writing instrument of Embodiment 1 according to the present invention;

FIG. 1B is a cross-sectional view of the writing instrument of Embodiment 1;

FIG. 1C is a cross-sectional view taken along line A-A of FIG. 1B;

FIG. 1D is a cross-sectional view taken along line B-B of FIG. 1B;

FIG. 2A is a perspective view illustrating a writing instrument refill of Embodiment 1;

FIG. 2B is a front view illustrating the writing instrument refill of Embodiment 1;

FIG. 2C is a side view illustrating the writing instrument refill of Embodiment 1;

FIG. 2D is a rear view illustrating the writing instrument refill of Embodiment 1;

FIG. 2E is a front view illustrating a rear end member of the writing instrument refill of Embodiment 1;

FIG. 3 is a diagram illustrating a state in which one refill protrudes in the writing instrument of Embodiment 1;

FIG. 4A is a perspective view illustrating another example of the refill (refill 210);

FIG. 4B is a front view illustrating another example of the refill (refill 210);

FIG. 40 is a side view illustrating another example of the refill (refill 210);

FIG. 4D is a rear view illustrating another example of the refill (refill 210);

FIG. 5A is a perspective view illustrating an example of another refill (refill 220);

FIG. 5B is a front view illustrating another example of the refill (refill 220);

FIG. 5C is a side view illustrating another example of the refill (refill 220);

FIG. 5D is a rear view illustrating another example of the refill (refill 220);

FIG. 6A is a cross-sectional view of a writing instrument to which another example of the refill (refill 210, 220) is attached;

FIG. 6B is a cross-sectional view of a writing instrument to which another example of the refill (refill 210, 220) is attached;

FIG. 7A is a diagram illustrating an appearance of a writing instrument of Embodiment 2;

FIG. 7B is a cross-sectional view of the writing instrument of Embodiment 2;

FIG. 70 is a cross-sectional view taken along line A-A of FIG. 7B;

FIG. 7D is a cross-sectional view taken along line B-B of FIG. 7B;

FIG. 8A is a cross-sectional view of the writing instrument of Embodiment 2 to which an example of another refill (refill 240, 250) is attached;

FIG. 8B is a cross-sectional view of the writing instrument of Embodiment 2 to which another example of the refill (refill 240, 250) is attached;

FIG. 9A is a cross-sectional view of the writing instrument of Embodiment 2 to which an example of another refill (refill 260, RF) is attached;

FIG. 9B is a cross-sectional view of the writing instrument of Embodiment 2 to which another example of the refill (refill 260, RF) is attached;

FIG. 10A Is a cross-sectional view of a writing instrument having a square cross-sectional shape to which an example of another refill (refill 310, 320) is attached;

FIG. 10B is a cross-sectional view of a writing instrument having a square cross-sectional shape to which an example of another refill (refill 330) is attached;

FIG. 11A is a cross-sectional view of a writing instrument having a hexagonal cross-sectional shape to which an example of another refill (refill 410) is attached;

FIG. 11B is a cross-sectional view of a writing instrument having a hexagonal cross-sectional shape to which an example of another refill (refill 420, 430, 440) is attached; and FIG. 11C is a cross-sectional view of a writing instrument having a hexagonal cross-sectional shape to which an example of another refill (refill 410, 450) is attached.

DESCRIPTION OF THE PREFERRED EMBODIMENTS

Hereinafter, embodiments of the present invention will be described specifically with reference to the drawings. The following embodiments are one form of embodiment of the present invention and are not limited to the scope of the present invention. In the following description, the longitudinal central axis line of a shaft tube or refill of a writing instrument is simply referred to as an axis line, and the direction in which a writing tip is disposed along the axis line is referred to as the front and the opposite side as the rear.

Embodiment 1

FIGS. 1A to 1D are diagrams illustrating a writing instrument of Embodiment 1 (multi-refill writing instrument 1), wherein FIG., 1A: Front view, FIG. 1B: Cross-sectional view cut along a plane including the axis line of a shaft tube, FIG. 1C: Cross-sectional view taken along line A-A of FIG. 1B, and FIG. 1D: Cross-sectional view taken along line B-B of FIG. 1B. FIG. 3 is a cross-sectional view cut along a plane including the axis line of the shaft tube in a writing state in which one of the refills is caused to slide forward.

The multi-refill writing instrument 1 is a so-called multi-color ball pen, and includes a shaft tube 12, a tip fitting 11 screwed to an end of the shaft tube 12, a plurality of refills 2 (three in this case) stored in the shaft tube 12, and a slide operation mechanism for selectively causing any of the plurality of refills 2 to come in and out.

The slide operation mechanism for causing the refills 2 to come in and out includes slide guides 13*a* to 13*c* arranged at the rear of the shaft tube 12, three springs (only a spring 14*a* is illustrated in the diagram) that urge the slide guides 13*a* to 13*c* to the rear side respectively, and three slits where the slide guides 13*a* to 13*c* are slidably arranged in the axial direction, the three slits being formed in the shaft tube 12.

When the user slides the slide guide 13*a* forward, a tip T at the tip of the refill 2 protrudes from a tip opening of the tip fitting, and the slide guide 13*a* moves inward in the radial direction of the shaft tube 12 and is locked, making the multi-refill writing instrument 1 ready for writing. When either one of the slide guides 13*b*, 13*c* is slid forward, it comes into contact with the slide guide 13*a* and pushes the slide guide 13*a* outward in the radial direction of the shaft tube 12, thereby releasing the locking of the slide guide 13*a*. The unlocked slide guide 13*a* slides rearward by the urging force of the spring 14*a* and returns to the housed state.

The mechanism for selectively causing any of the plurality of refills 2 to come in and out can be of any configuration, including the slide operation mechanism illustrated in the present embodiment, as well as a rotary operation mechanism that is activated by a rotary operation for rotating a front shaft and a rear shaft relative to each other in a circumferential direction.

FIGS. 2A to 2D are diagrams illustrating a refill of the multi-refill writing instrument 1 of Embodiment 1, wherein FIG. 2A: Perspective view, FIG. 2B: Front view, FIG. 2C: Side view, FIG. 2D: Rear view.

The refill 2 includes:

- a first portion 21 with flexibility that can be bent when in use;
- a second portion 22 having a cross-sectional area larger than that of the first portion 21; and
- a connecting portion 23, on the rear side of the second portion 22, that is configured to have a cross-sectional area smaller than that of the second portion 22,
- wherein the center of figure (centroid) of the cross section (cross-sectional view) of the first portion 21 orthogonal to the axis line of the refill 2 is offset from (eccentric with respect to) the center of figure of the cross section (cross-sectional view) of the second portion 22 orthogonal to the axis line of the refill 2, the first portion 21 and the second portion 22 are formed integrally, and a part of the first portion (small outer diameter portion 211) has its outer diameter smaller than that of the other part of the first portion 21.

The first portion 21 is formed into a tubular shape having the tip T attached to the tip and filled with ink inside.

As illustrated in FIG. 3, the first portion 21 has greater flexibility than the second portion 22 so that the tip can be curved toward the center (tip opening of the tip fitting 11) when sliding. The second portion 22 is also configured to have a larger cross-sectional area than the cross-sectional area of the first portion 21 so that the refill 2 has a larger capacity than in the prior art. The first portion 21 and the second portion 22 are formed integrally so that the refill 2 can be produced with high productivity. In the present embodiment, the first portion 21 and the second portion 22 are molded integrally with high productivity by means of injection molding of thermoplastic resin. Furthermore, in order to increase the flexibility of the refill 2, the first portion 21 has the small outer diameter portion 211, in which the outer diameter of a part of the first portion 21 is configured to be smaller than the outer diameter of the other part. In the present embodiment, the small outer diameter portion 211 is formed at a rear end portion of the first portion 21. This configuration can further favorably increase the flexibility of the refill 2. Furthermore, in the present embodiment, the small outer diameter portion 211 is formed at a joint portion between the first portion 21 and the second portion 22, which are continuously formed integrally in the axial direction. This configuration can further favorably increase the flexibility of the refill 2.

The cross-sectional shape of the first portion 21 may be, for example, a polygonal tubular cross-sectional shape in addition to the tubular cross-sectional shape illustrated in the present embodiment. In such a case, the outer diameter of the small outer diameter portion may be determined/defined based on the circumscribed/inscribed circle of the polygon.

In the present embodiment, the small outer diameter portion 211 is exemplified as a cylindrical portion whose entire circumference of its outer diameter has the same radius and is smaller than the other portions, but the small outer diameter portion 211 may have greater flexibility than the other parts of the refill 2 (i.e., its cross-sectional secondary moment is smaller than the other parts), and for example, only a part of the circumferential direction (e.g., only the outer (tensile load) portion of the curve) may be formed as a concave portion. When configured in this manner, the strength reduction in the small outer diameter portion, which is a thin portion, can be suppressed to increase the strength of the refill to withstand removal from the injection die and writing in which the writing instrument is bent repeatedly.

The second portion 22 is a cylindrical member that is connected to the first portion 21 and filled with ink inside.

The cross-sectional area of the second portion 22 is configured to increase from the center of figure of the cross section of the first portion 21 toward the center of figure of the cross section of the second portion 22 when viewing the center of figure of the cross-section (cross-sectional view) of the first portion 21 orthogonal to the axis line of the refill 2 and the center of figure of the cross-section (cross-sectional view) of the second portion 22 orthogonal to the axis line of the refill 2 in the axial direction of the refill 2. In other words, the cross-sectional area of the second portion 22 is configured to increase from the axis line of the first portion 21 toward the axis line of the second portion 22, In the present embodiment, the second portion 22 is a fan-shaped cross section (see FIGS. 1C and 1D), and the central angle of the fan shape is 120°. This means that the sides of the second portion 22 include planes, and that one of the sides (curved surface) of the second portion 22 is in close proximity to an inner circumferential wall of the shaft tube 12, as illustrated in FIGS. 1C and 1D.

The second portion 22 can have any cross-sectional shape such as a polygonal cross-sectional shape in which the cross-sectional area of the second portion 22 increases from the center of figure of the cross section of the first portion 21 toward the center of figure of the cross section of the second portion 22 to become larger than the cross-sectional area of the first portion 21 so that the volume of the second portion 22 can be increased.

The connecting portion 23 is a member connected to the slide guides 13*a* to 13*c*, and is a tubular member that receives and fits inside fitting protrusions formed on the tip side of the slide guides 13*a* to 13*c*. The connecting portion 23 is formed as a rear end member E1 that fits into the second portion 22.

FIG. 2E is a front view illustrating the rear end member E1.

The rear end member E1 includes a fitting portion E11 that is inserted and fitted in a rear end opening of the second portion 22, a flange portion E12, and the connecting portion 23.

The fitting portion E11 has an external cross-sectional shape formed to be approximately identical to the cross-sectional shape of the rear end opening of the second portion 22, and is fitted and assembled to a rear end portion of the second portion 22.

The flange portion E12 has its external cross-sectional shape formed to be approximately identical to the external cross-sectional shape of a rear end surface of the second portion 22, and comes into abutment with the rear end surface of the second portion 22 when the fitting portion E11 is inserted into the rear end opening of the second portion 22.

In the present embodiment, after filling, from behind, ink and ink follower into the large rear end opening of the second portion 22, which is integrally molded by injection molding with the first portion 21, the rear end opening of the second portion 22 can be roughly closed by assembling the rear end member E1 to the second portion 22 from behind, thereby improving the productivity of the refill 2.

The multi-refill writing instrument 1 is configured as a so-called three-color ball pen that contains three refills 2 described above (including a plurality of refills whose configuration is identical).

The cross-sectional shape of the second portion 22 is configured as a fan shape, with each central angle being 120°, so that the sides of the second portion 22 are close to each other when the plurality of refills 2 are arranged in the shaft tube 12, as illustrated in FIGS. 1C and 1D.

According to the multi-refill writing instrument 1 including the plurality of refills 2 of the present embodiment, the capacity of each refill 2 can be increased and the writing distance can be lengthened by providing the second portion 22 with the refills 2. Especially in gel ink ball pens, although the writing distance tends to be shorter due to the high absorption rate of ink on paper, the increased ink capacity allows each refill 2 to have a longer writing distance.

In the multi-refill writing instrument 1 including the plurality of refills 2 of the present embodiment, the configuration in which the second portion 22 is arranged to equally divide the container in the shaft tube 12 allows for efficient use of said container. That is, as can be understood from FIGS. 1C and 1D, the internal space (cross-section thereof), which is the container of the shaft tube 12, can be efficiently utilized, and the capacities of the refills can be maximized within the limited container of the writing instrument.

It is preferred that the total cross-sectional area of the second portion of the plurality of refills arranged in the shaft tube be at least 50% or more of the cross-sectional area of the shaft tube (the container that accommodates the plurality of refills)

In the multi-refill writing instrument 1 including the plurality of refills 2 of the present embodiment, with each of the refills 2 being placed inside the shaft tube 12, the center of figure of the cross section of the first portion 21 is offset from (eccentric with respect to) the center of figure of the cross section of the second portion 22 at the joint portion between the first portion 21 and the second portion 22, so that each first portion 21 is arranged near the axis line of the shaft tube 12. This reduces the amount of curve and the curvature of the curve when the tip of the refill 2 is bent toward the axis line of the shaft tube 12 (the tip opening of the tip fitting 1I) during the sliding operation to cause the refill 2 to protrude.

Because the refill 2 of the present embodiment has the second portion 22 with increased capacity, the flexibility of the second portion 22 is lower than that of the conventional refills that are formed in a cylindrical shape along their entire length. To compensate for the reduced flexibility of the second portion 22, as can be understood from FIG. 3, the first portion 21 bends significantly toward the axis line of the shaft tube 12 (tip opening of the tip fitting 11) in a relatively short length, and therefore tends to have an increased curvature of the curve, increasing the stress on the member.

As can be understood from FIG. 1C, the refills 2 of the present embodiment are configured to reduce the amount of curve (curvature) obtained when the refill 2 bends toward the axis line of the shaft tube 12 (tip opening of the tip fitting 11), by arranging the first portion 21 near the axis line of the shaft tube 12 (tip opening of the tip fitting 11).

By making the rear end member E1 with the position of the connecting portion 23 adjusted so as to be positioned in the same position as the slide guide of an existing multi-color ball pen, and by configuring the second portion 22 and the like to fit within the shaft tube of an existing multi-color ball pen, the refill 2 of the present embodiment can be assembled and used with the existing multi-color ball pen, With this configuration, the user can also use the refill 2 of the present embodiment by assembling it to an existing writing instrument owned by the user, which is highly convenient for the user.

Although the present embodiment has illustrated the multi-refill writing instrument 1 that includes the plurality of refills 2 that are identical in their configuration, the present embodiment may be a multi-refill writing instrument that includes a plurality of refills with different configurations.

FIGS. 4A to 4D are diagrams illustrating an example of a refill (refill 210) having a configuration different from the configuration described above, wherein FIG. 4A: perspective view, FIG. 4B: Front view, FIG. 4C: Side view, and FIG. 4D: Rear view. In addition, FIGS. 5A to 5D are diagrams illustrating an example of a refill (refill 220) having another different configuration, wherein FIG. 5A: Perspective view, FIG. 5B: Front view, FIG. 5C: Side view, and FIG. 5D: Rear view.

The configuration of the refill 210 and the refill 220 except for the second portion can be similar to that of the refill 2 described above; thus, the same reference symbols are used and the description thereof is omitted here accordingly. The external cross-sectional shape of the connecting portion 23 is formed to match the external cross-sectional shape of a second portion 212 or a second portion 222, as in the refill 2 described above.

The second portion 212 of the refill 210 is formed to have an approximately fan-shaped cross-sectional shape with a central angle of 180°. As will be described in detail later, in order to position the first portion 21 closer to the center of the fan-shaped cross-sectional shape, the central part of the approximately fan-shaped cross-sectional shape of the second portion 212 is formed with a convex portion protruding in a direction away from the center of figure of the cross-sectional shape.

The second portion 222 of the refill 220 is formed to have an approximately fan-shaped cross-sectional shape with a central angle of 70°. As will be described in detail later, a concave portion, which faces the convex portion of the second portion 212 of the refill 210, is formed in the radius of the approximately fan-shaped cross-sectional shape of the second portion 222 of the refill 220.

FIGS. 6A and 6B are cross-sectional views of a multi-refill writing instrument assembled with one refill 210 and two refills 220, FIGS. 6A and 6B corresponding to FIGS. 1C and 1D. Other than the refills, the configuration of the multi-refill writing instrument is the same as that of the multi-refill writing instrument 1 described above.

By using a plurality of refills having mutually different cross-sectional shapes of the second portion of the refills, that is, refills with different capacities, it is possible, for example, to provide a three-color ball pen configured to have a larger capacity of black ink, which is used more frequently.

As illustrated in FIGS. 6A and 6B, a position where a side of the refill 210 and a side of the refill 220 comes into abutment with each other is not located on a central line CL passing through the axis line of the cross section of the shaft tube 12, but is offset from the central line CL.

In this configuration, each of the first portions 21 of the plurality of refills 210, 220 with different cross-sectional shapes can be positioned near the axis line of the shaft tube 12 and on the same circle centered on the axis line. When each of the first portions 21 of the plurality of refills 210, 220 with different cross-sectional shapes is arranged on the same circle centered on the axis line of the shaft tube 12, the stress caused by the curvature of each of the first portions 21 can be made uniform. This prevents the stress associated with the curvature loaded on the first portion 21 of the refill farthest from the axis line of the shaft tube 12 of the plurality of refills from being excessive compared to the stress loaded on the other refills.

In addition, in order to position the first portion 21 close to the axis line of the shaft tube 12, the refill 210 is formed to have a cross-sectional shape in which the center of a planar side surface of the second portion 212 protrudes outward (in the direction away from the center of figure in the cross-sectional view) beyond the side surface formed on said plane as a convex portion (bulging out to the bottom in FIGS. 6A and 6B). In a side of the refill 220, a concave portion is formed on a part of the side of the refill 220 that is opposite to the convex portion of the refill 210 within the shaft tube 12. In this case, the concave portion may also be formed on the opposite side of the refill 210 that does not face the convex portion of the refill 210, to make the cross-sectional shape of the second portion 222 of the refill 220 symmetrical. With this configuration, the first portion 21 and the second portion 222 of the integrally formed refill 220 can be composed of common parts.

In the example illustrated in FIG. 6A, the first portions 21 of the respective refills are arranged in close proximity to each other near the axis line of the shaft tube 12, and the center of figure of the cross section of each first portion 21 is arranged on the same circle with a radius of 1.95 mm that is centered on the axis line of the shaft tube 12.

In the example illustrated in FIG. 6B, in order to assemble to a multi-refill writing instrument having an existing configuration (equal arrangement with 120° central angle), for the rear end members, rear end members E2*a* and E2*b* are assembled, which are different members on the left and right (members with a specified position for attachment to the multi-refill writing instrument 1). In this case, it is suitable because the refills 2 can be attached to the multi-refill writing instrument having the existing configuration (equal arrangement with 120° central angle). On the other hand, in other embodiments where a multi-refill writing instrument is configured in which the connecting portion 23 of a rear end member is arranged the same way as the first portion 21 illustrated in FIG. 6A (arrangement with central angles 125° and 110°), the entire refill including the rear end member may be composed of common parts (refill with no specification on the attachment position to the multi-refill writing instrument). In this case, the user can more easily attach, to the multi-refill writing instrument, the refill composed of common parts with no specified attachment position to the multi-refill writing instrument.

In the examples illustrated in FIGS. 6A and 6B, in order to configure the refills 220 with common parts, two arranged refills 220 have a V-shaped gap therebetween. However, in yet other embodiments, without configuring the refills 220 with common parts, and instead of configuring the left and right refills 220 with different parts (parts with specified attachment positions to the multi-refill writing instrument), the refills 220 may be configured to not have the V-shaped gap therebetween.

Embodiment 1 has described a multi-refill writing instrument with three refills as an example, but the present invention is not limited thereto and may be a multi-refill writing instrument including two refills or a multi-refill writing instrument including four or more refills.

The following Embodiment 2 will describe a multi-refill writing instrument including two refills.

Embodiment 2

FIGS. 7A to 7D are diagrams illustrating the writing instrument of Embodiment (multi-refill writing instrument 200), wherein FIG. 7A: Front view, FIG. 7B: Cross-sectional view cut along a plane including the axis line of a shaft tube, FIG. 7C: Cross-sectional view taken along line A-A of FIG. 7B, and FIG. 7D: Cross-sectional view taken along line B-B of FIG. 7B.

The multi-refill writing instrument 200 is a so-called multi-color ball pen, similar to that of Embodiment 1, and includes a shaft tube 12*d*, the tip fitting 11 screwed to a tip of a shaft tube 12*d*, two refills 230 stored in the shaft tube 12*d*, and a slide operation mechanism for selectively causing either one of the two refills 2 to come in and out.

The same reference symbols as in Embodiment 1 are used for the same configurations as in Embodiment 1, and the descriptions are simplified or omitted here accordingly.

As illustrated in FIGS. 7C and 7D, the refills 230 are configured so that the cross-sectional shape of the second portions are a fan shape with a central angle of 180° (i.e., a semicircle shape). In the multi-refill writing instrument 200, since two refills 230 having the foregoing configuration are used, the internal space of the shaft tube 12*d* can be used without any waste or idle, maximizing the capacities of the refills within the limited size of the writing instrument, as illustrated in FIGS. 7C and 7D.

FIGS. 8A and 8B are cross-sectional views of a multi-refill writing instrument with refills 240 and 250 attached, illustrating examples of different refill capacities. The configuration of the multi-refill writing instrument other than the refills is the same as that of the multi-refill writing instrument 200 in Embodiment 2.

The second portion of the refill 240 is configured to have a fan-shaped cross-sectional shape with a central angle of 240°, and the second portion of the refill 250 is configured to have a fan-shaped cross-sectional shape with a central angle of 120°. Note that these are examples, and the second portions may have a fan-shaped cross-sectional shape with any central angle.

FIGS. 9A and 9B illustrate a cross-sectional view of an example of a multi-refill writing instrument that has a combination of a refill 260 configured so that the cross-sectional shape of the second portion is a fan shape with a central angle of 270° and a conventional refill RF that is formed in a cylindrical shape along its entire length without the configurations of the second portion as mentioned above, the refill 260 and the refill RF being attached to the multi-refill writing instrument. The configuration of the multi-refill writing instrument other than the refills is the same as that of the multi-refill writing instrument 200 in Embodiment 2.

Each of the foregoing embodiments has described a multi-refill writing instrument with a tubular cross-sectional shape as an example, but in other embodiments, a multi-refill writing instrument with any cross-sectional shape may be used.

FIGS. 10A and 10B illustrate examples of such a multi-refill writing instrument having a square cross-sectional shape. FIGS. 11A, 11B, and 11C illustrate examples of multi-refill writing instruments with a hexagonal cross-sectional shape.

In the examples illustrated in FIGS. 10A, 10B, 11A, 11B, and 11C, the second portion of a refill is configured to increase the ink capacity in each multi-refill writing instrument by having an external shape that is in line with the inner circumferential wall surface of the container of the multi-refill writing instrument.

Each of the foregoing embodiments has described a multi-color ball pen as an example of a multi-refill writing instrument, but in other embodiments, for example, a multi-functional ball pen that further includes a mechanical pencil refill having the function of a mechanical pencil may be used.

In addition, although each of the foregoing embodiments has described a gel ink ball pen refill as an example of the ink that the refills of each embodiment have, in other embodiments, for example, a water-based rollerball pen refill, an oil-based ballpoint pen refill, a marking pen refill, and other refills further including other ink may also be used.

Each of the foregoing embodiments has illustrated a multi-refill writing instrument as a writing instrument, but in yet other embodiments, the writing instrument may include only one of the refills disclosed in each of the above embodiments. In this case, the writing instrument can be configured with an excellent refill that allows for favorable bending of the flexible first portion, while having a long writing distance and high productivity, thus providing an excellent writing instrument designed with a high degree of freedom in the placement position of the writing tip and the cross-sectional shape of the shaft tube, and the like.

Although each of the foregoing embodiments has illustrated that the connecting portionis formed as a rear end member as a separate portion from the first and second portions, in other embodiments, the refills disclosed in each of the foregoing embodiments may be further manufactured as an integral portion by other manufacturing methods. For example, the entire refills disclosed in each of the foregoing embodiments may be formed as an integral portion by utilizing other manufacturing methods such as blow molding or 3D printing.

1 Multi-refill writing instrument (writing instrument)
2 Refill (writing instrument refill)
21 First portion
211 Small outer diameter portion
22 Second portion
23 Connecting portion All references, including publications, patent applications, and patents, cited herein are hereby incorporated by reference to the same extent as if each reference were individually and specifically indicated to be incorporated by reference and were set forth in its entirety herein.

The use of the terms “a” and “an” and “the” and similar referents in the context of describing the invention (especially in the context of the following claims) is to be construed to cover both the singular and the plural, unless otherwise indicated herein or clearly contradicted by context. The terms “comprising,” “having,” “including,” and “containing” are to be construed as open-ended terms (i.e., meaning “including, but not limited to,”) unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments of this invention are described herein, including the best mode known to the inventors for carrying out the invention. Variations of those exemplary embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The exemplary invention is not limited to the exemplary embodiments detailed above. The specific configuration of each portion can be modified within the range not departing from the purpose of the exemplary invention.

The descriptions of the various exemplary embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, the Applicant's intent is to encompass the equivalents of all claim elements, and no amendment to any claim of the present application should be construed as a disclaimer of any interest in or right to an equivalent of any element or feature of the amended claim.

What is claimed is:

1. A writing instrument refill, including:

a first portion having flexibility; and a second portion having a cross-sectional area larger than a cross-sectional area of the first portion, wherein a center of figure of a cross section of the first portion is offset from a center of figure of a cross section of the second portion, the first portion and the second portion are formed integrally, and a part of the first portion has an outer diameter smaller than an outer diameter of other part of the first portion, wherein the cross-sectional area of the second portion is configured to increase from the offset center of figure of the cross section of the first portion toward the center of figure of the cross section of the second portion.

2. The writing instrument refill according to claim 1, wherein the flexibility of the first portion is higher than a flexibility of the second portion.

3. The writing instrument refill according to claim 1, wherein the part of the first portion that has an outer diameter smaller than the outer diameter of the other part of the first portion is disposed at a rear end portion of the first portion.

4. The writing instrument refill according to claim 1, wherein a side of the second portion includes a plane.

5. The writing instrument refill according to claim 1, wherein a cross-sectional shape of the second portion is a fan shape.

6. The writing instrument refill according to claim 5, wherein the fan shape has a central angle of any one of 120°, 180°, or 240°.

7. The writing instrument refill according to claim 1, wherein a rear side of the second portion further includes a connecting portion configured to have a cross-sectional area smaller than the cross-sectional area of the second portion.

8. A writing instrument, including a plurality of the refills according to claim 1.

9. The writing instrument according to claim 8, wherein at least one of sides of the second portions of the plurality of refills is configured to be in close proximity to an inner circumferential wall.

10. The writing instrument according to claim 8, wherein sides of the second portions of the plurality of refills are configured to be in close proximity to each other.

11. The writing instrument according to claim 8, including a plurality of the identical refills.

12. The writing instrument according to claim 11, wherein centers of figures of cross sections of first portions of the plurality of refills are arranged on the same circle centered on a center of figure of a cross section of a container containing the plurality of refills, and at least one of the sides of the second portions of the plurality of identical refills is offset from a straight line passing through the center of figure of the cross section of the container.

13. The writing instrument according to claim 8, wherein cross-sectional shapes of the second portions of the plurality of refills are different from each other.

14. The writing instrument according to claim 8, wherein a total cross-sectional area of the second portions of the plurality of refills is 50% or more of a cross-sectional area of the container containing the plurality of refills.

* * * * *